US008343433B2

(12) United States Patent
Conneway et al.

(10) Patent No.: US 8,343,433 B2
(45) Date of Patent: Jan. 1, 2013

(54) TUBE REACTOR

(75) Inventors: Fred A. Conneway, Titusville, FL (US);
Harvey E. Andresen, Luling, LA (US);
Clarence P. Stadlwieser, Sherwood Park (CA); Donald L. Kurle, St. Albans, WV (US); Bernie B. Osborne, Hurricane, WV (US)

(73) Assignee: Dow Technology Investments LLC, Midland, MI (US)

( * ) Notice: Subject to any disclaimer, the term of this patent is extended or adjusted under 35 U.S.C. 154(b) by 337 days.

(21) Appl. No.: 12/735,028

(22) PCT Filed: Dec. 8, 2008

(86) PCT No.: PCT/US2008/013501
§ 371 (c)(1),
(2), (4) Date: Sep. 21, 2010

(87) PCT Pub. No.: WO2009/116977
PCT Pub. Date: Sep. 24, 2009

(65) Prior Publication Data
US 2011/0034709 A1 Feb. 10, 2011

Related U.S. Application Data

(60) Provisional application No. 61/008,062, filed on Dec. 18, 2007.

(51) Int. Cl.
*F28D 7/16* (2006.01)
*C07D 301/10* (2006.01)

(52) U.S. Cl. .................. 422/201; 549/534; 549/541

(58) Field of Classification Search .................. 422/201; 549/534
See application file for complete search history.

(56) References Cited

U.S. PATENT DOCUMENTS

| 3,146,075 | A | 8/1964 | Robb et al. |
| 4,061,659 | A | 12/1977 | Nielsen et al. |
| 4,376,209 | A | 3/1983 | Watanabe et al. |
| 5,179,215 | A | 1/1993 | Ramachandran et al. |
| 5,719,299 | A | 2/1998 | Te Raa |
| 5,840,932 | A | 11/1998 | Evans et al. |
| 6,497,856 | B1 | 12/2002 | Lomax, Jr. et al. |
| 2002/0106316 | A1 | 8/2002 | Billig et al. |
| 2004/0115118 | A1 | 6/2004 | Olbert et al. |
| 2005/0118088 | A1 | 6/2005 | Olbert et al. |

FOREIGN PATENT DOCUMENTS

| CA | 1022178 | 12/1977 |
| CS | 201736 | 4/1983 |
| DE | 10144857 | 3/2003 |
| EP | 0130807 | 1/1985 |
| EP | 0257937 | 3/1988 |
| EP | 0532325 | 3/1993 |
| JP | 3403476 | 7/1995 |
| WO | 02/26370 | 4/2002 |
| WO | 2004/056463 | 7/2004 |
| WO | 2004/072055 | 8/2004 |

OTHER PUBLICATIONS

Kustov, Borovkov, and Kazansky, Spectra of Hydroxyl Groups in Zeolites in the Near-Infrared Region, revised Jun. 26, 1981, pp. 149-159, Journal of Catalysis, Academic Press, Inc.
International Search Report and Written Opinion from PCT application PCT/US2008/013501, dated Sep. 15, 2009, 14 pages.
Notification Concerning Transmittal of International Preliminary Report on Patentability, from PCT Application PCT/US2008/013501, dated Jul. 1, 2010, 8 pages.
I, Wachs, C. Chersich, "Postreactor Reactions During Ethylene Oxidation Over Silver", Journal of Catalysis, 1981, pp. 160 to 165, vol. 72, Issue 1.

*Primary Examiner* — Bernard Dentz
(74) *Attorney, Agent, or Firm* — Brooks, Cameron & Huebsch, PLLC

(57) ABSTRACT

Apparatus, methods, and processes are provided for a tube reactor including multiple, substantially parallel reaction tubes arranged within a tube reactor shell, the reaction tubes spaced apart such that a thermal fluid can flow between the tubes and transfer heat between the tubes and the thermal fluid during operation; an inlet head defining an inlet head space, where the inlet head space is in fluid communication with an inlet end of the reaction tubes, and an outlet head including an outlet head shell and at least one insert positioned within an outlet head space defined by the outlet head, where the insert defines a reduced volume outlet head space relative to that defined by the outlet head, and where the reduced volume outlet head space is in fluid communication with an outlet end of the reaction tubes and in fluid communication with a reactor outlet.

18 Claims, 7 Drawing Sheets

TUBE REACTOR

This application is a National Stage application under 35 U.S.C. 371 of PCT/US2008/013501, and published as WO 2009/116977 on Sep. 24, 2009, which claims priority in part from U.S. Provisional Application Ser. No. 61/008,062 filed Dec. 18, 2007, the entire content of which is incorporated herein by reference.

BACKGROUND

The oxidation of ethylene to ethylene oxide can be accomplished by reaction with air or oxygen in the presence of a silver catalyst mounted on a suitable carrier, with the optional addition of small amounts of certain chlorinated hydrocarbons which serve to moderate the catalyst. Under normal operating conditions, the oxidation reaction produces mostly ethylene oxide, with carbon dioxide and water as side products. The reaction is exothermic.

The construction of the reactor where the oxidation is carried out can be similar to a vertical shell and tube heat exchanger. The tubes are filled with the catalyst while the shell side of the reactor is provided with a coolant. Suitable pumps, heat exchangers, separator drums, and/or condensers can be employed to condense, or separate, and recirculate the coolant.

In some cases, without careful temperature control, the oxidation reaction can proceed to the formation of carbon dioxide and water vapor. This not only reduces the yield, but is a much more exothermic reaction which can cause "hot spots" within the reactor and a consequent increase in the demands made upon the cooling system. In addition, the "hot spots" can increase local temperatures and can spread rapidly to the reactor outlet, leading to a bulk gas phase ignition, referred to herein as a "decomp".

SUMMARY

The present disclosure relates to tube reactors for conducting exothermic reactions such as alkene oxidation reactions. Embodiments are adaptable to commercial scale ethylene oxide production.

As used herein, a "hot spot," is an uncontrolled, gas-phase reaction occurring inside of a catalyst bed located in a reactor tube in which oxygen is depleted.

Embodiments of the present disclosure include a tube reactor including multiple, substantially parallel reaction tubes arranged within a tube reactor shell, the reaction tubes being spaced apart such that a thermal fluid can flow between the tubes and transfer heat between the tubes and the thermal fluid during operation. The tube reactor also includes an inlet head positioned adjacent the tube reactor shell defining an inlet head space, where the inlet head space is in fluid communication with an inlet end of the reaction tubes and an outlet head positioned adjacent to the tube reactor shell. The outlet head includes an outlet head shell and at least one insert positioned within an outer head space defined by the outlet head, where the insert defines a reduced volume outlet head space relative to that defined by the outlet head, and where the reduced volume outlet head space is in fluid communication with an outlet end of the reaction tubes and in fluid communication with a reactor outlet.

Gas residence times in the outlet head can be reduced when embodiments of the tube reactor of the present disclosure are operated. The reduced gas residence times permit hot reaction gases to be passed more quickly to a cooling step and can help to reduce the formation of reaction by-products. Areas of stagnant gases are also reduced or eliminated, again helping to reduce by-product formation and, in cases in which the process gases are flammable, helping to reduce the risks of fire due to the development of "decomps" in the outlet head space.

DETAILED DESCRIPTION

Embodiments of the present disclosure include apparatuses, methods, and processes for tube reactors and the operation of tube reactors. For purposes of illustration, the present disclosure is discussed in its application to the production of ethylene oxide, however, it is understood that embodiments of the present disclosure are not limited to this application.

FIGS. 1A-1D illustrates an embodiment of a tube reactor 100 according to the present disclosure. The tube reactor 100 includes an exterior shell 102 that encloses a space that contains reactor tubes 104. In some embodiments, the reactor tubes 104 can be arranged substantially parallel to each other and can be oriented vertically with the reactor tube outlets at the bottom of the tube reactor 100. In some embodiments, the tube reactor 100 can be oriented with the tube outlets at the top. Also, the tube reactor 100 can be oriented horizontally, or at some angle to the horizontal, if desired for specific applications.

Figure 1A:
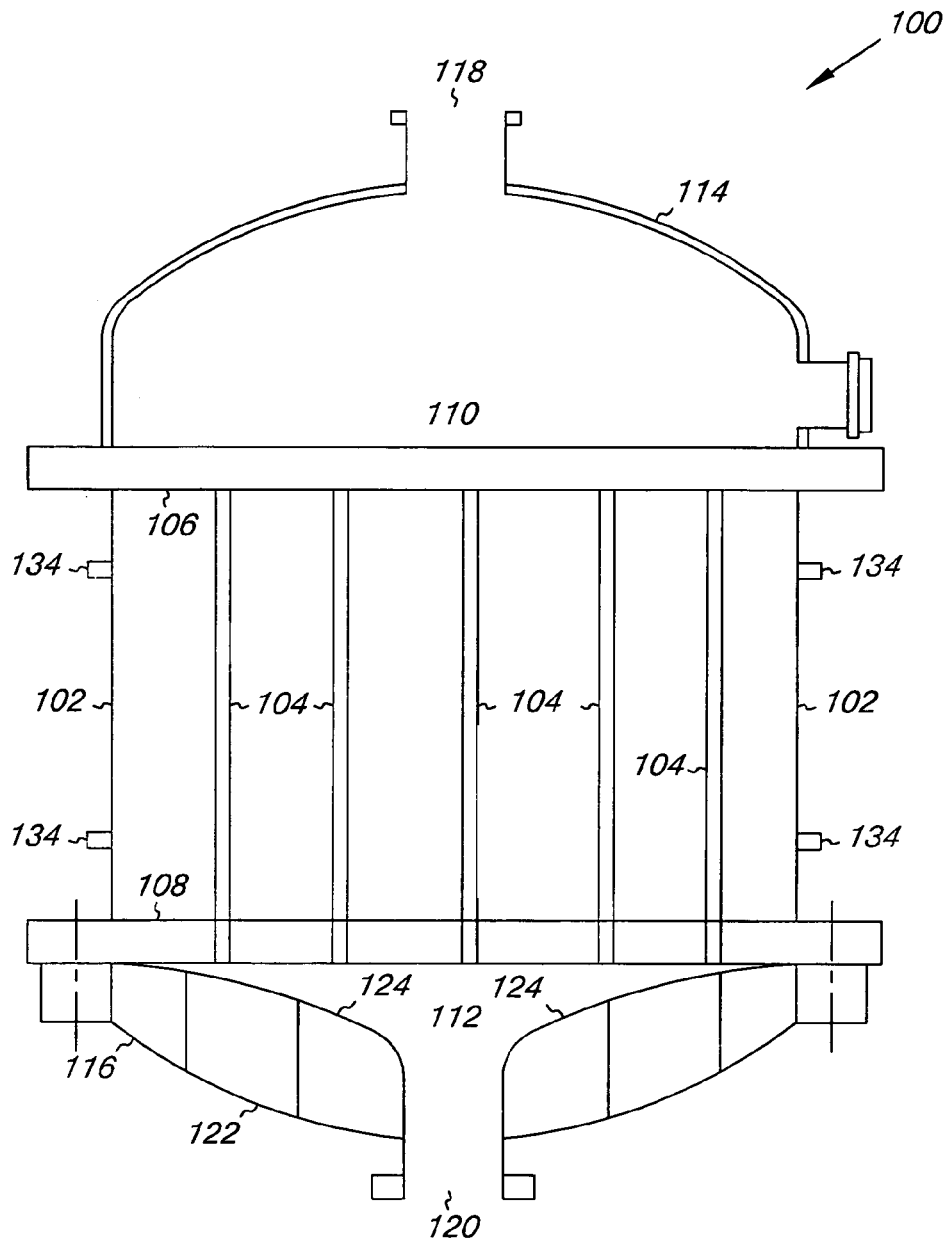
FIG. 1A is a front view, in section, of an embodiment of a tube reactor of the present disclosure.

The reactor tubes 104 are spaced apart from each other in order to permit thermal fluid to circulate between adjacent reactor tubes 104 to transfer heat between the thermal fluid and the reactor tubes 104. As illustrated in FIG. 1A, the tube reactor 100 contains a small number of reactor tubes for purposes of illustration. Also, the spacing between the tubes 104 is exaggerated, again for purposes of illustration. In various embodiments, the tube reactor 100 can contain reactor tubes 104 in a range of hundreds to thousands.

In some embodiments, the reactor tubes 104 can be held in place within the tube reactor shell 102 via a top tubesheet 106 and a bottom tubesheet 108. The tubesheets 106, 108 have openings to allow process gases to enter the reactor tubes 104 from the inlet head space 110. Alternatively, the reactor tubes 104 can extend through the top tubesheet 106 into the inlet head space 110. Similarly, the bottom tubesheet 108 has openings to permit process gases to enter an outlet head space 112 from the reactor tubes 104. Again, the reactor tubes 104 can extend through the bottom tubesheet 108 into the outlet head space 112.

In some embodiments, various types of additional supports can be provided between the top tubesheet 106 and the bottom tubesheet 108. For example, additional supports can include additional tubesheets, various types of brackets, baffles, and the like.

As shown in FIG. 1A, the tube reactor 100 also includes an inlet head 114 and an outlet head 116 (e.g., in embodiments where the reactants have a downward flow during operation). As shown, the inlet head 114 is positioned adjacent the tube reactor shell 102 at a top position and the outlet head 116 is positioned adjacent the tube reactor shell 102 at a bottom position. Embodiments can also include the inlet head 114 positioned at the bottom position and the outlet head 116 positioned at the top position.

The inlet head 114 defines the inlet head space 110. Reactants can be introduced into the tube reactor 100 through an inlet conduit 118, where the reactants enter the inlet head space 110. As illustrated, from the inlet head space 110, the reactants can enter the tubes 104 and flow downwardly through the tubes 104, where the reactants come into contact with a catalyst and the desired reaction occurs. Reaction product gases thus exit the bottom of the tubes 104 and enter the outlet head space 112, where the reaction product gases from the various tubes 104 mix and enter the outlet conduit 120.

Commercial scale tube reactors of the type illustrated in FIG. 1 can be very large, for example, containing hundreds or thousands of tubes and having a shell diameter in a range of three (3) meters to as large as twenty (20) meters. Because of the large size, the inlet head 114 and outlet head 116 are designed with a rounded cross-section, as illustrated in FIG. 1A. The curved shape of the inlet head 114 and the outlet head 116 can permit the heads to have the needed structural strength at reasonable masses. However, because of the architecture of the heads 114, 116, the volume of the inlet head space 110 and the outlet head space 112 can be significant. Large head spaces result in larger residence times within the head spaces. In addition, circulation of reaction products within the head spaces is not uniform and as a result, hot spots can form in regions where pockets of stagnant and/or recirculating gas exist. In the hot spot regions, unwanted side reactions can occur as well as an increased risk of decomps.

To reduce the occurrence of the formation of hot spot regions, embodiments of the present disclosure seek to reduce the volume of the outlet head space 112, provide for initial rapid mixing of the reaction product gases exiting the reactor tubes 104, and/or provide for the redistribution of the reaction gases in the outlet head space 112. As such, in some embodiments, the residence time of the reaction product gases in the outlet head 112 can be minimized. In addition, the residence time distribution, or the probability distribution function that describes the amount of time the reaction product gases can spend inside the outlet head space 112, can be tightened to reduce a long residence time "tail."

In various embodiments, local hot spots formed as reaction product gases exit some of the reactor tubes 104 can be blended rapidly with cool reaction product gases exiting other reactor tubes 104, preventing ignition and/or unwanted side reactions.

Because of the size of the tube reactors 100, it is not practical to reduce the outlet head space volume simply by using a smaller outlet head. The mass of such an outlet head would be much greater than that of the curved outlet head 116 as shown in FIG. 1, thus the cost and weight associated with such a head makes it impractical. As such, as illustrated in FIG. 1A, the outlet head 116 includes an outlet head shell 122 and an insert 124. Together with the bottom tubesheet 108, the insert 124 can define the volume of the outlet head space 112.

As shown, the volume of the outlet head space 112 is considerably smaller than the volume that, in the absence of the insert 124, would be defined by the bottom tubesheet 108 and the outlet head shell 122. The smaller volume can reduce stagnant areas and can increase flow velocities through the outlet head space 112, while also decreasing residence times of the reaction product gases in the outlet head space 112. For example, the process gases can flow through the bottom tubesheet 108 at a velocity of approximately twenty-five (25) feet per second or more and the residence time of the reaction product gases can be approximately 0.1 second or less. Moreover, the flow pattern of the reaction product gases contain no large scale eddies.

In some embodiments, the insert 124 can reduce the outlet head 116 volume by at least twenty-five (25) percent as compared to an outlet head 116 of the same configuration without the insert 124. In various embodiments, the insert 124 reduces outlet head 116 volume by at least fifty (50) percent. The insert 124 may reduce outlet head 116 volume by up to sixty (60) percent, by up to seventy-five (75) percent, by up to eighty-five (85) percent, or by up to ninety (90) percent or more.

In addition, flow rates (i.e., gas velocities) through the outlet head 116 can increase with greater reductions in outlet head 116 volume. Also, residence times in the outlet head 116 decrease correspondingly.

In some cases, too great a reduction in outlet head 116 volume can make it difficult to achieve high bulk flow rates at reasonable operating pressures since the path through the outlet head 116 can become restricted. Thus, the upper limit on how much the outlet head 116 volume can be reduced may, in some cases, be limited by desired bulk flow rates and/or operating pressures.

Figure 1B:
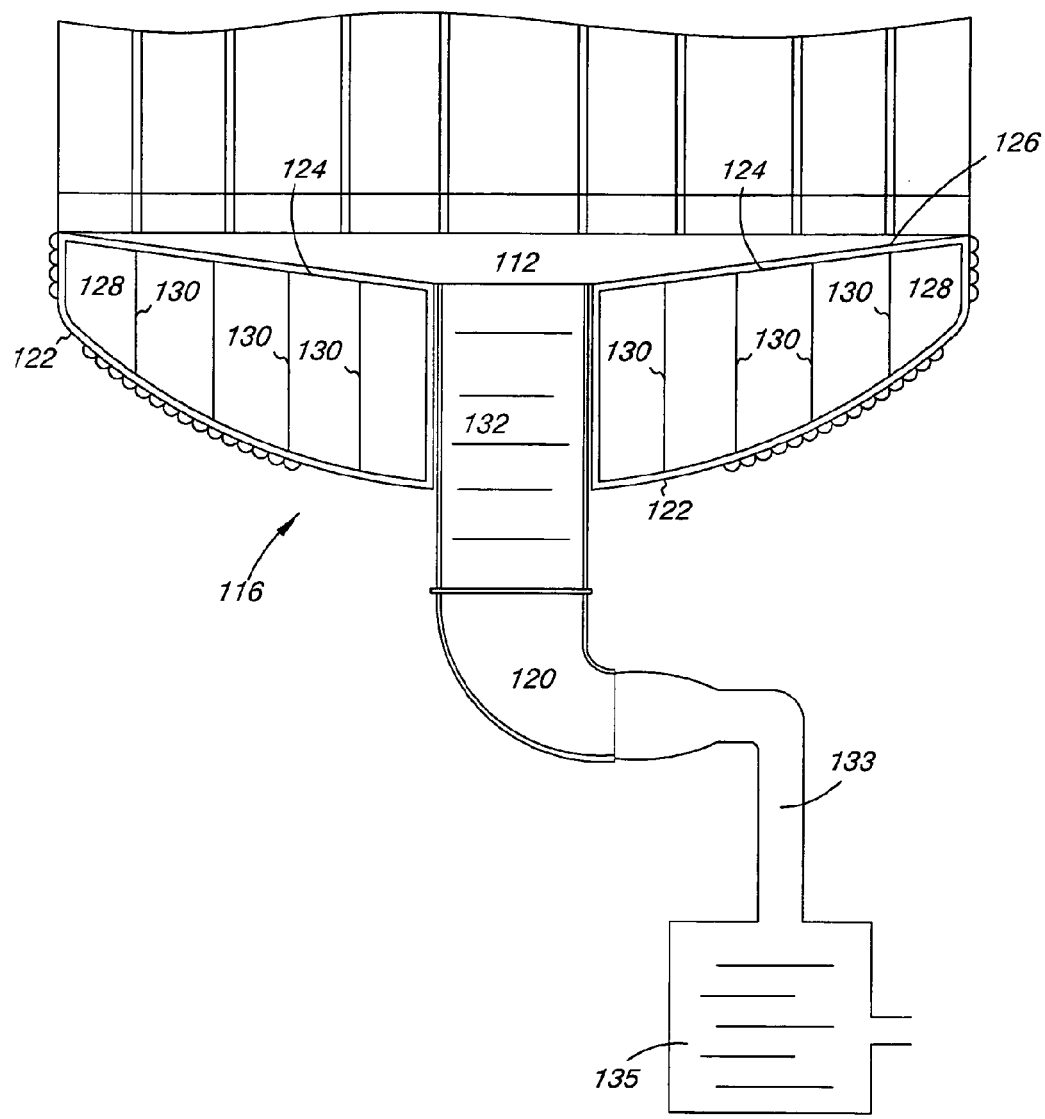
FIG. 1B is a front view, partially in section, of an outlet head with insert for use with embodiments of the present disclosure.

FIG. 1B illustrates an embodiment of the outlet head 116 according to the present disclosure in greater detail. The insert 124 is shown sloping downwardly from an edge region 126 towards the outlet 120. As such, the height of the outlet head space 112 is greater near the center than at the edges of the insert 124. This configuration can improve flow rates (e.g., both gas velocities and bulk flow rates) and can help eliminate stagnant areas, particularly near the outer edges of the outlet head space 112.

The outlet head shell 122 also can curve downwardly from the edges toward the outlet 120, but can curve at a more gradual rate as compared to the insert 124. The difference in curvature can cause the outlet head shell 122 to be displaced away from the insert 124, forming a space 128 between the outlet head shell 122 and the insert 124. In such embodiments, reaction product gases do not come into contact with the outlet head shell 122, except perhaps at the region adjacent to the outlet 120, and the outlet head shell 122 is somewhat thermally isolated from the process fluids.

In some embodiments, the outlet head shell 122 is designed to bear approximately all the weight of the outlet head 116 as well as other applied stresses. In such embodiments, the external curvature of the outlet head shell 122 can permit the outlet head shell 122 to be made using reasonable masses of construction materials. In addition, the insert 124 bears little weight or stress, and thus can be made from relatively thin materials in order to conserve mass.

In some embodiments, the insert 124 can be self-supporting. In addition, in various embodiments the insert 124 can have a light weight construction obtained by using a thinner material for the insert 124 as compared to a self-supporting insert 124. In such embodiments, the light weight insert 124 can include additional supports, such as a number of support cylinders 130, which can traverse the space 128 and transfer the load from the insert 124 to the outlet head shell 122. The insert 124 can be formed of a metal, polymer, and/or a ceramic material, provided that the material of construction is capable of withstanding process temperatures, does not catalyze reactions of the process gases and/or otherwise react with the process gases, and is otherwise chemically stable under the conditions of the particular process.

As illustrated in FIG. 1B, in some embodiments, the outlet head 116 can cool reaction product gases within the outlet head 116. In various embodiments, a method of cooling the process gases can use a thermal fluid to absorb heat from the reaction product gases. Also, in some embodiments, as shown, reaction product gases can be cooled within the outlet head space 112 by passing the process gases through a heat exchanger 132 before the reaction product gases exit the reactor tube 100 via the outlet 120.

In some embodiments, the heat exchanger 132 can capture the heat from the process gases and reuse the heat elsewhere. In some cases, the partially heated thermal fluid can be circulated to the tube reactor 100 to provide cooling to the reactor tubes. In some embodiments, the partially heated thermal fluid can be circulated to a flange system of the tube reactor shell 102 and outlet head 116 to equilibrate the temperatures of each, as discussed further herein.

In some embodiments, the ability to cool the reaction product gases immediately downstream of the point at which they exit the reactor tubes can be beneficial in reducing the formation of unwanted reaction byproducts. This is particularly true in alkene oxidation processes (e.g., ethylene oxide processes), in which aldehydes and other unwanted byproducts often form in the hot reaction product gases that exit the reaction tubes before the gases can be cooled. In the embodiment shown in FIG. 1B, the presence of the heat exchanger 132 within the outlet head 116 can permit the reaction product gases to be cooled rapidly, and can reduce byproduct formation as compared to an outlet head 116 without the heat exchanger 132, particularly in ethylene oxide production processes.

In some embodiments, as shown in FIG. 1B, the outlet 120 located downstream of the heat exchanger 132 can be further connected by, for example, piping 133, to a second heat exchanger 135. The reaction product gases can pass through the heat exchanger 132, through the outlet 120, and through the pipe 133 to the second heat exchanger 135. The second heat exchanger 135 can further cool the reaction product gas coming from the outlet 120.

In some embodiments, the second heat exchanger 135 is close-coupled to the heat exchanger 132. As used herein, "close-coupled" refers to coupling the second heat exchanger 135 at as short of a distance as possible from the heat exchanger 132. In some embodiments, the length of the piping 133 can be less than one hundred (100) feet, more preferably, less than fifty (50) feet, and still more preferably, less than ten (10) feet. In addition, the diameter of the piping 133 can be as small as possible, preferably less than one hundred (100) inches in diameter and more preferably less than sixty (60) inches in diameter. Minimizing the distance between the heat exchanger 132 and the second heat exchanger 135 can reduce the residence time of the gas in the zone between the two heat exchangers and can further reduce the formation of reaction by-products.

In some embodiments, the reaction product gases can be cooled entirely within the outlet head 116. In various embodiments, the process gases can be cooled partially within the outlet head 116. For example, the heat exchanger 132 can be positioned entirely or only partially within the outlet head 116. In embodiments where the heat exchanger 132 is positioned partially within the outlet head 116, the heat exchanger 132 can extend outwardly beyond the confines of the outlet head 116 in order to provide a larger region for heat transfer, more thoroughly completing the cooling.

As shown in FIG. 1A, in operation, process gases enter the inlet head space 110 through the inlet 118. The process gases become distributed among and enter the reactor tubes 104. The reactor tubes 104 are, in some embodiments, at least partially filled with a catalyst for the desired reaction of the process gases. As the process gases flow through the reactor tubes 104, they can react in the presence of the catalyst. The reaction product gases then flow out of the reactor tubes 104 and into the outlet head space 112. In the embodiment shown in FIG. 1A, the reaction product gases exit the outlet head space 112 through the outlet 120.

In some embodiments, the reaction occurring within the reaction tubes 104 can be highly exothermic, which is the case, for example, for an ethylene oxide oxidation reaction. In various embodiments, the exotherm can be controlled by circulating a thermal fluid within the shell 102 and around the exterior of the tubes 104. In some embodiments, water is the cooling fluid. Water can be boiled to produce steam, therefore additional cooling can be provided since additional heat required to vaporize the steam is removed from the system.

Thermal fluid can be introduced through one or more ports 134, through which it enters the tube reactor 100 and flows through the spaces between the reactor tubes 104, coming into contact with the reactor tubes 104, and providing either heating or cooling to the reaction process.

In some embodiments, the thermal fluid can provide cooling, for example, when the reaction occurring at the catalyst within the reactor tubes 104 is exothermic. However, in other embodiments, the thermal fluid can heat the reactor tubes 104 to a temperature that is needed to produce a desired reaction at a desired reaction rate. In various embodiments, when the reaction is exothermic, the thermal fluid can provide heat, for example, during start-up to initiate the reaction or to provide process control until steady-state conditions are achieved. Thermal fluid can be withdrawn from the tube reactor 100 through one or more ports 134.

In some embodiments, the outlet head 116 is removably affixed to the tube reactor shell 102 in order to permit access to the interior of the tube reactor 100 for purposes such as maintenance, repair, and/or catalyst removal and/or replacement. In some embodiments, the outlet head 116 and tube reactor shell 102 include a flange system, as shown in FIG. 1B and in an enlarged view in FIG. 1C.

Figure 1C:
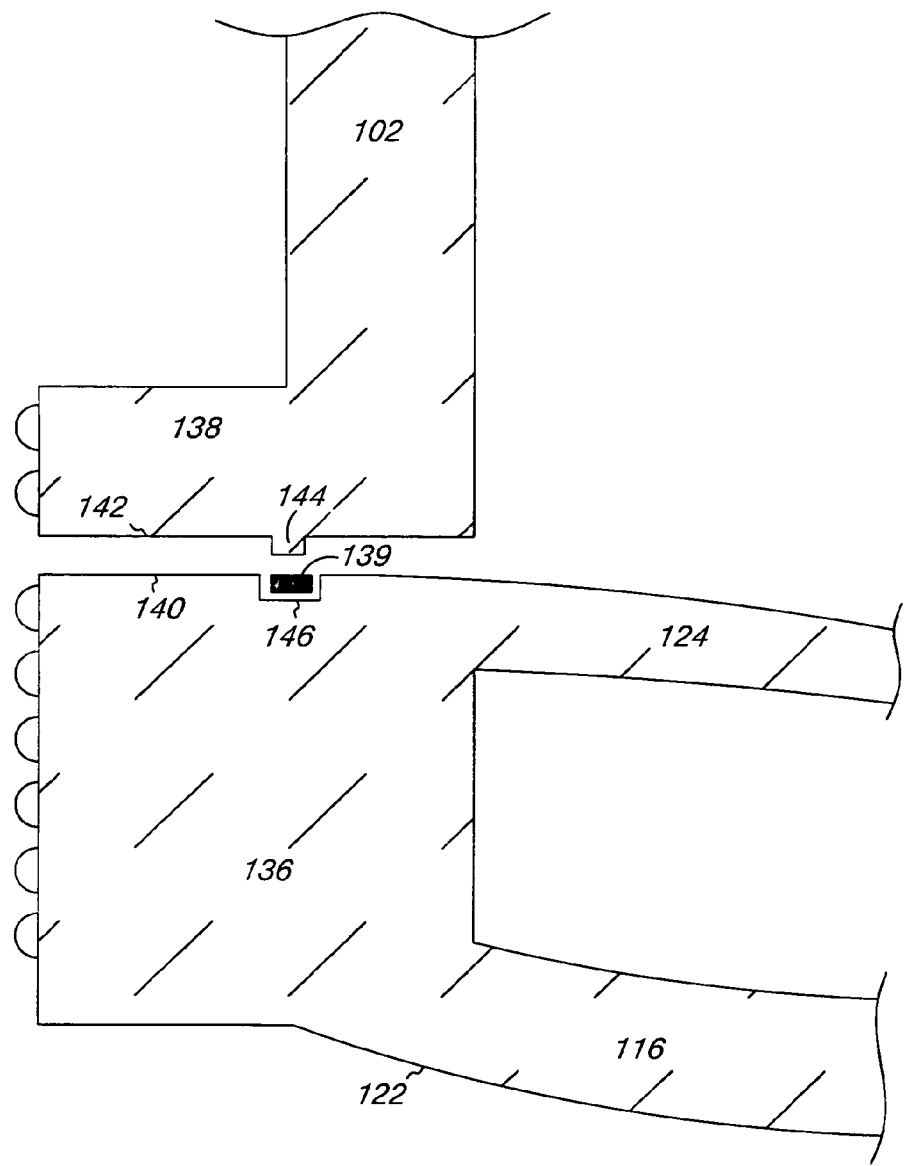
FIG. 1C is a front sectional view of a flange region of a tube reactor shell and removable outlet head in accordance with embodiments of the present disclosure.

As shown in FIG. 1C, a suitable flange system includes mating circumferential flanges 136 and 138, where the mating circumferential flanges 136, 138 are attached to the bottom portions of the outlet head 116 and the tube reactor shell 102, respectively. The flanges 136, 138 can have mating surfaces 140, 142 where the flanges 136, 138 meet when joined. In some embodiments, the flanges 136, 138 can be an extension of the tube reactor shell 102 and/or tubesheet 106.

Optionally, the mating surfaces 140, 142 can include one or more additional mating features, which can assist in aligning the outlet head 116 and the tube reactor shell 102 in the correct relative position during assembly. One such type of alignment feature is a circumferential tongue-and-groove assembly. As shown in FIG. 1C, the flange 138 can include a raised tongue 144 which can fit into a corresponding recessed groove 146 in the flange 136. In some embodiments, the groove 146 can be somewhat wider than the tongue 144 for easier assembly. In various embodiments, the raised tongue 144 can be located in flange 138 and the corresponding recessed groove 146 can be located in flange 136. In addition, although not shown in FIG. 1C, a gasketing material 139 can be included within the groove 146 to aid in sealing the tube reactor 100. Also, other types of guides can be incorporated into the flange system, including guide pin-and-hole arrangements.

As discussed herein, the diameter of the tube reactor 100 can range, for example, from two (2) meters to twenty (20) meters or more. Due to the size of the reactor 100, the relative thermal expansion or contraction of the tube reactor shell 102 and the outlet head 116 can become an important design consideration for a number of reasons. For example, the outlet head shell 122 of the outlet head 116 can be at least partially thermally isolated from the reaction product gases due to the presence of the insert 124. Therefore, the outlet head shell 122 can be, periodically, at a significantly different temperature than the tube reactor shell 102, especially during start-ups, shut-downs, and during process upsets. The difference in temperature can result in different degrees of thermal expansion of tube reactor shell 102 and outlet head shell 122 and can create significant stresses due to the large diameter of the equipment. The stresses can cause distortion and break the seal at the flange. In some cases, the equipment can be damaged by the thermal stresses.

Due to the possibility of thermal stresses causing damage to the equipment, embodiments of the present disclosure maintain the outlet head shell 122 at a temperature approximately equal to the temperature of the tube reactor shell 102. The temperatures can be maintained approximately equal using a number of methods. For example, heating and/or cooling can be provided by applying forced heated or cooled gas to the surface of the outlet head shell 122. Heating can also be provided using electrically resistive coils included in the outlet head shell 122.

In some embodiments, thermal fluid can be introduced to the outlet head shell 122. The thermal fluid can be applied via a jacket (e.g., located on the interior and/or exterior surface of the outlet head shell 122), and/or through conduits that pass within the outlet head shell 122, and/or on the outlet head shell's 122 interior and/or exterior surface.

In various embodiments, a temperature control system can be included, for example, including temperature measuring devices which operate the temperature control system in response to the temperature of the outlet head shell 122. Also, a variety of pumping or actuation systems can be included which can produce a flow of the thermal fluid in response to, for example, temperature differences between the outlet head shell 122 and the tube reactor shell 102.

In some embodiments, the method of maintaining the temperature of the outlet head shell 122 and the tube reactor shell 102 at approximately equal temperatures includes contacting the outlet head shell 122 with a thermal fluid that is also used to control the temperature inside the tube reactor 100. As discussed herein, a thermal fluid can be introduced into the tube reactor 100 to provide temperature control. For example, the thermal fluid can be introduced to control heat generated in exothermic reactions that take place within the reactor tubes 104 and/or be used to supply heat to a reaction.

During operation, the temperature of the tube reactor shell 102 can closely approximate the temperature of the thermal fluid inside the tube reactor 100 since the tube reactor shell 102 is in contact with the thermal fluid. Therefore, by circulating the thermal fluid into contact with the outlet head shell 122, the temperature of the outlet head shell 122 can be brought to approximately the same temperature as the tube reactor shell 102. Thermal expansion and/or contraction of the two segments can therefore be closely matched, and stresses, distortion, and/or leakages associated with differential thermal expansion between the two sections can be minimized.

In addition, in order to match thermal expansion and contraction of the tube reactor shell 102 and the outlet head shell 122, the two segments can be formed of the same material or formed of different materials that have similar coefficients of linear thermal expansion.

Contacting the thermal fluid from the reaction tube 100 with the outlet head shell 122 decreases the need for a separate temperature control system since a close temperature match between the tube reactor shell 102 and the outlet head shell 122 can be obtained simply due to the circulation of the same thermal fluid to both components.

Figure 1D:
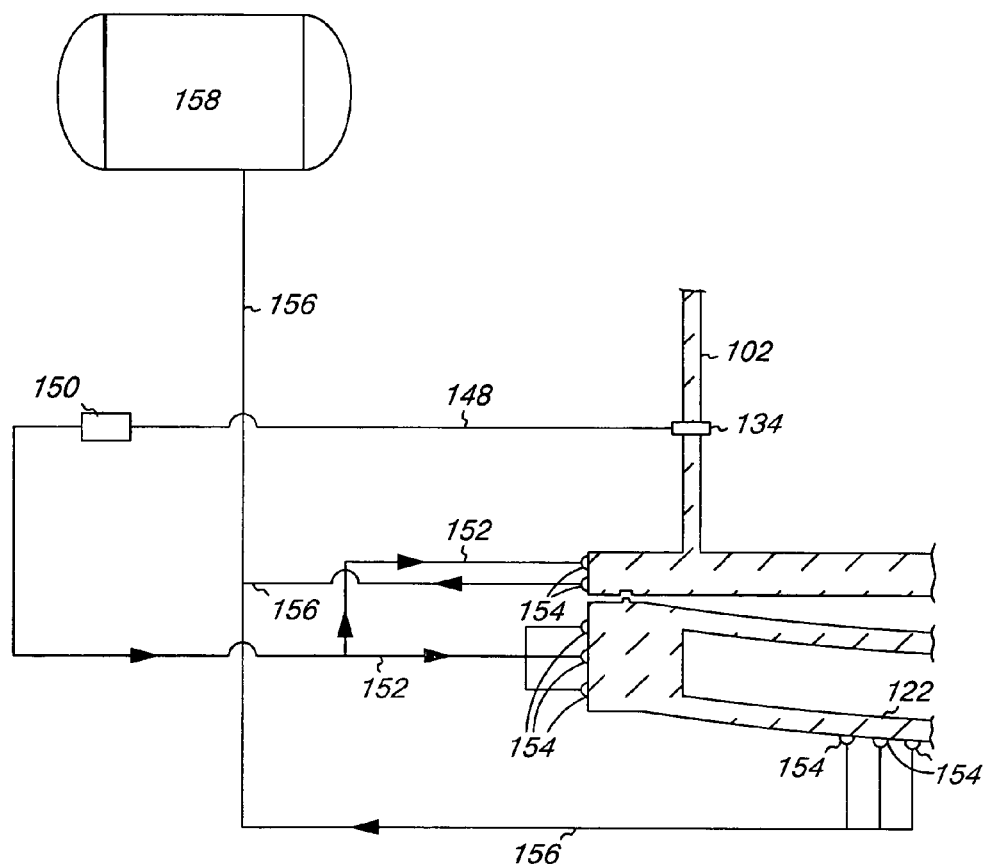
FIG. 1D is a schematic view of a system for circulating thermal fluid from the tube reactor shell to a flange region of the tube reactor shell and removable outlet head in accordance with embodiments of the present disclosure

FIG. 1D illustrates an embodiment of a conduit system to transport the thermal fluid to the outlet head shell 122, according to the present disclosure. In FIG. 1D, thermal fluid can be withdrawn from the tube reactor through the port 134 in the tube reactor shell 102. The withdrawn fluid can then pass through the conduit 148, through the pump 150, and into a series of additional conduits 152. The additional conduits 152 can be in fluid communication with a number of half-pipes 154, such that thermal fluid can enter the half-pipes 154 and provide cooling or heating to the outlet head shell 122.

Also, as shown in FIG. 1D, thermal fluid can also be introduced to the flanges 136, 138 so that temperature across the flange area is also equilibrated. Thermal fluid can then be withdrawn from the half-pipes 154 through the exit conduits 156 and, in the embodiment shown, circulated to a drum 158. In some embodiments, the thermal fluid circulated to the drum 158 can be introduced to the drum 158 by means of a vertical internal standpipe to avoid hammering, as appreciated by one skilled in the art. In addition, the various conduits 154 can include various apparatuses for balancing and/or otherwise controlling the flow of thermal fluid through and/or between the conduits 154.

Figure 2:
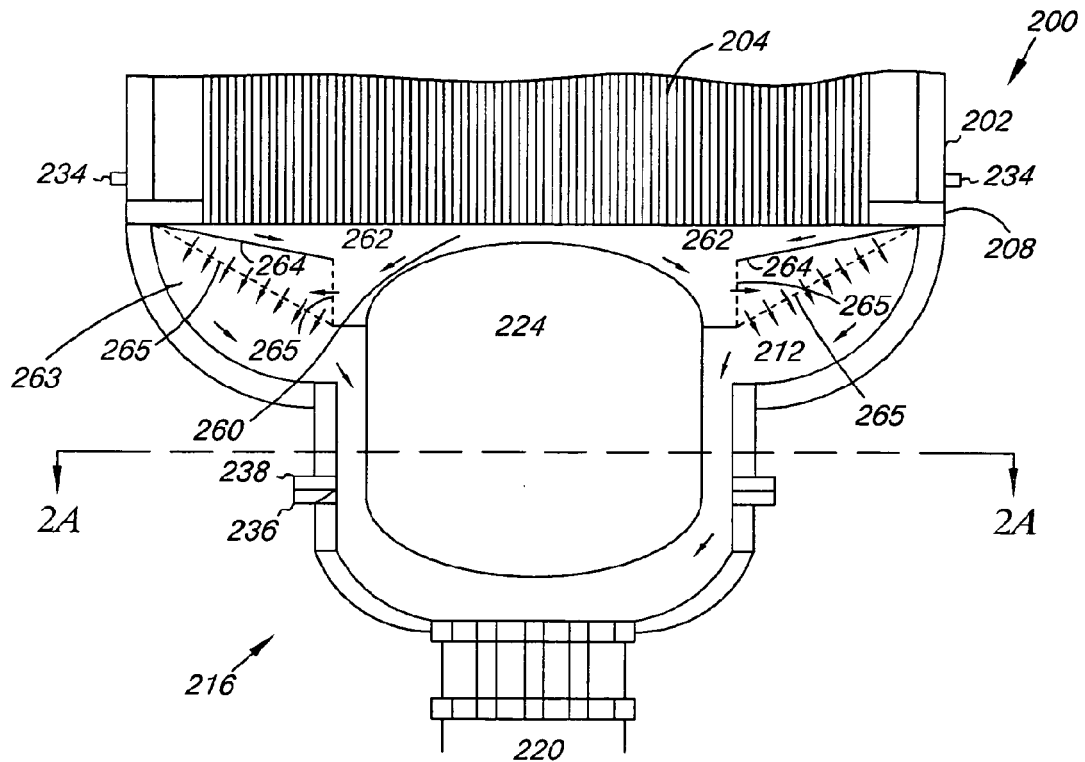
FIG. 2 is a front view, partially in section, of an embodiment of the present disclosure.

FIG. 2 illustrates an embodiment of a tube reactor 200 according to an embodiment of the present disclosure. As shown in FIG. 2, the tube reactor 200 includes an exterior shell 202 that encloses a space that contains reactor tubes 204, as discussed herein. In addition, as discussed herein, a top tubesheet and a bottom tube sheet 208 can hold the tubes 204 in position within the tube reactor shell 202. Ports 234 enter the tube reactor shell 202 for the introduction and withdrawal of thermal fluid. Also, process gases can enter the tube reactor 200 through the inlet in an inlet head.

As shown in FIG. 2, the outlet head 216 can be removably affixed to the tube reactor shell 202 via optional flanges 236 and 238, but it is possible that the outlet head 216 be permanently affixed to the tube reactor shell 202. If the outlet head 216 is removable, then a method for maintaining the temperature of the outlet head 216 approximately equal to that of the tube reactor shell 202 can be used, if necessary, to prevent differential thermal expansion, as discussed herein.

As illustrated, the insert 224 can reside within the outlet head 216, occupying a central region of the head space 212 defined by the outlet head 216. The insert 224 can be supported in position within the outlet head 216 using any appropriate structure, such as various types of bracketing and supports.

As shown, the insert 224 can be positioned within the outlet head 216 so a space 260 exists between the outlet ends of the reaction tubes 204 and the insert 224, to permit reaction product gases to enter the outlet head 216. The space 260 can separate the insert 224 from the outlet head 216, providing a restricted path through which process gases can flow toward the outlet 220. Reaction product gases entering the outlet head 216 can contact the top of the insert 224 and flow radially outward, in the directions of arrows 262, where they enter the space 260 and flow downward toward the outlet 220.

Figure 2A:
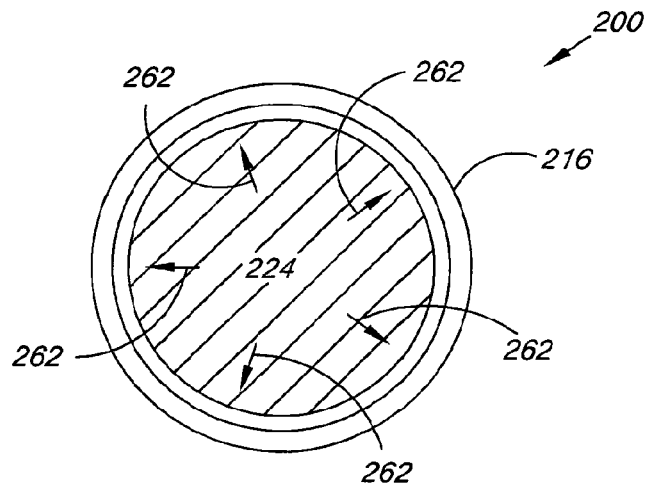
FIG. 2A is a top sectional view, taken along lines 2A-2A of FIG. 2, showing an outlet head with insert in accordance with embodiments of the present disclosure.

FIG. 2A is a top-down view of the tube reactor 200 taken at line 2A in FIG. 2. Gas velocities through an annular space 266 can be increased relative to velocities in the absence of the insert 224, thereby reducing residence time and reducing byproduct formation and stagnant areas. In some embodiments, the residence time can be reduced by up to forty (40) percent as compared to the outlet head 216 without the insert 224.

In the embodiment shown, the insert 224 can be hollow or solid, however, by including a hollow insert 224, mass and cost can be reduced as compared to a solid insert 224. In such embodiments, the insert 224 can be filled with an inert gas, for example, nitrogen.

As shown in FIG. 2, the outlet head 216 can include an additional insert 263 in addition to the insert 224. In this embodiment, the additional insert 263 can be a diverter plate 264. As used herein, a "diverter plate" refers to a non-perforated plate positioned in the outlet head space 212 to direct the flow of reaction product gases exiting the reaction tubes 204 and/or rapidly mix the reaction product gases in the outlet head space 212 to reduce the occurrence of hot spots and/or stagnant areas. In some embodiments, the outlet head 216 can include a number of diverter plates 264.

As shown by the arrows in FIG. 2, diverter plates 264 positioned in a substantially horizontal position below the reaction tube 204 outlets can direct the flow of reaction product gases from reaction tubes 204 on an outer periphery of the tube reactor 200 towards the insert 224. In addition, diverter plates 265 positioned in a substantially vertical position and in an angled position below the horizontal diverter plates 264 can be perforated and can rapidly mix the reaction product gases as they flow around the horizontal diverter plates 264 and the insert 224 and through the perforated diverter plates 265.

As discussed herein, in some embodiments, the outlet head 216 can be removably affixed to the tube reactor shell 202 in order to permit access to the interior of the tube reactor 100 for purposes such as maintenance, repair, and/or catalyst removal and/or replacement. In such embodiments, the insert 224 and/or diverter plates 264, 265 can be permanently positioned within the outlet head 216 since the outlet head 216 can be removed when, for example, the reaction tube 204 catalyst is replaced.

In some embodiments, however, the outlet head 216 can be welded to the tube reactor shell 202. In such embodiments, manways can be provided to allow for a person to enter the outlet head 216 to perform maintenance, repair, and/or catalyst removal and/or replacement. As one skilled in the art will appreciate, however, when the outlet head 216 is provided with enough space for a person to enter the outlet head 216, the outlet head space 212 size increases, residence times in the outlet head 216 increase, and the risk of hot spot formation and possible consequent ignition and/or byproduct formation increases.

Figure 3:
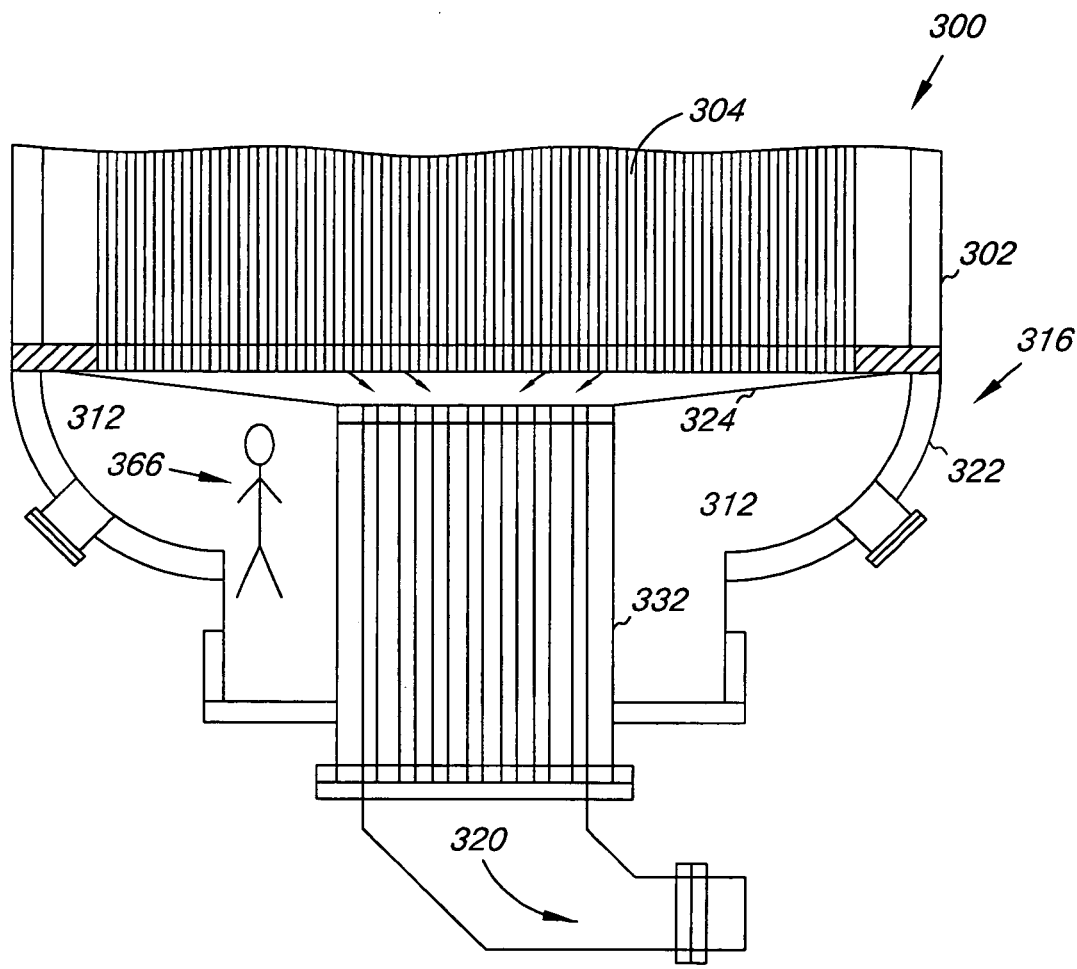
FIG. 3 is a front view, in section, of an outlet head according to embodiments of the present disclosure.

FIG. 3 illustrates an embodiment of a tube reactor 300 according to the present disclosure. As shown in FIG. 3, the outlet head 316 is welded to the tube reactor shell 302, and the outlet head 316 is large enough to fit a person 366 in the outlet head space 312. To decrease the residence time of the reaction product gases exiting the tubes 304 in the outlet head 316, an insert 324 can be positioned in the outlet head 316. In such embodiments, the insert 324 can be brought into the outlet head 316 in pieces and assembled in the outlet head 316, as shown in FIG. 3.

Since the insert 324 is assembled in the outlet head 316 from separate pieces, it is possible that the pieces would not join together to create a fluid-tight seal. In addition, it is possible that the pieces would not be able to sustain full-process pressure as assembled. As such, in some embodiments, an inert gas (e.g., methane, nitrogen) can be flowed into the space 312 between the insert 324 and the outlet head shell 322, maintaining a positive pressure inside the space 312 to prevent or minimize reaction product gases from entering the space 312.

As illustrated, the embodiment shown in FIG. 3 includes a heat exchanger 332 positioned at least partially in the outlet head 316. The heat exchanger 332 can be used to quickly cool the reaction product gases exiting the reactor tubes 304, as discussed herein. In some embodiments, the outlet head 316 does not include the heat exchanger 332 and the insert 324 is constructed to direct the flow of reaction product gases to the outlet 320 as quickly as possible.

Figure 4:
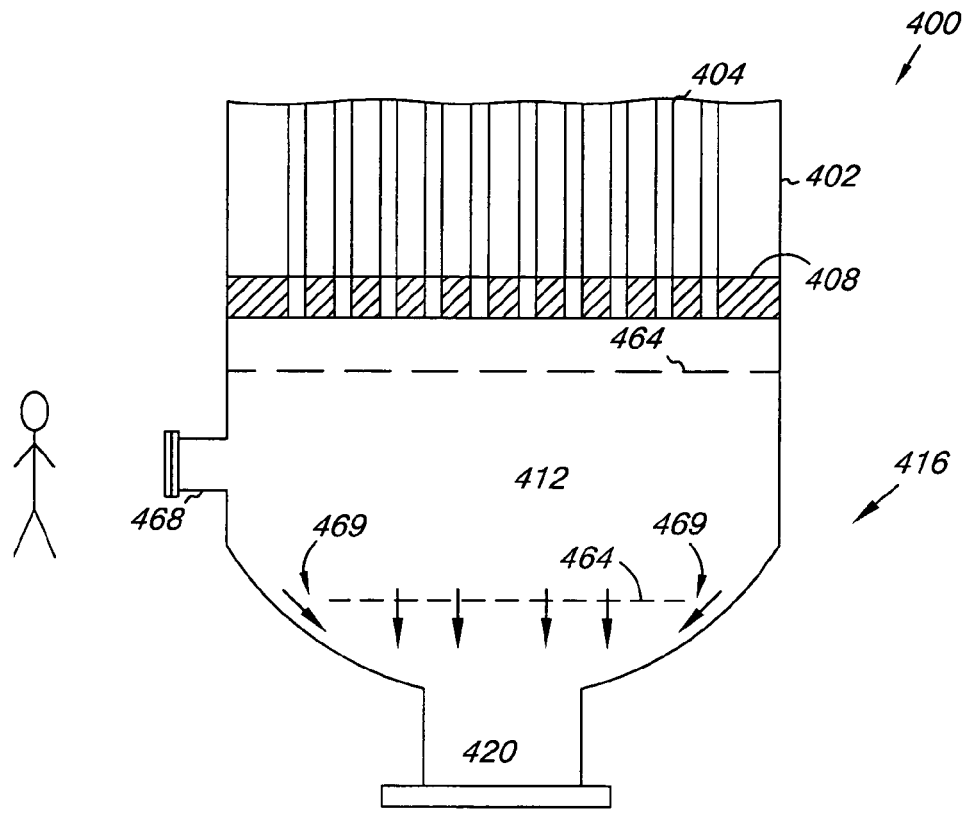
FIG. 4 is a front view, in section, of an outlet head according to embodiments of the present disclosure.

FIG. 4 illustrates an embodiment of a tube reactor 400 according to embodiments of the present disclosure. As discussed herein, in some embodiments, the outlet head 416 can be permanently affixed (e.g., welded) to the tube reactor shell 402. In such embodiments, the outlet head space 412 is large enough for a person to enter the outlet head 416 for maintenance, repairs, and/or catalyst removal and/or replacement. As such, the outlet head space 412 has an increased volume as compared to embodiments with a removable outlet head 416 with an insert positioned in the outlet head 416.

As shown in FIG. 4, in some embodiments, the tube reactor 400 can include an insert where the insert is a diverter plate 464. The diverter plate 464 can be positioned directly below the bottom of the reaction tubes 404 and can have a perforated construction. As such, the reaction product gases exiting the reaction tubes 404 can be forced to flow horizontally between the bottom tubesheet 408 and the diverter plate 464, thus achieving rapid mixing of gases between "hot-spotted" tubes 404 and normal temperature tubes 404. The reaction product gases can also flow through a small number of perforations in the diverter plate 464 and into the outlet head space 412. By rapidly mixing the reaction product gases, hot gas formed in a reaction tube 404 can be quickly mixed with cold gas from the other reaction tubes 404, reducing the occurrence of hot spots.

In such embodiments, the diverter plate 464 can be formed of pieces small enough to fit through a manway 468 and can be bolted in place in the outlet head 416. In addition, to avoid any stagnant areas in the outlet head space 412, gas flow can be introduced into the outlet head space 412 to move the reaction product gases towards the outlet 420 in the outlet head 416.

In some embodiments, the outlet head 416 can also include a second diverter plate 464 to redistribute the reaction product gases in the outlet head space 412. The second diverter plate 464 can have a perforated construction, allowing the reaction product gas to flow through the diverter plate 464 and in the annular space 469 between the diverter plate 464 and the outlet head 416 thus promoting positive flow along the outlet head 416 wall and reducing the accumulation of catalyst dust.

The process gases used during operation of the foregoing embodiments of the invention can be any material or mixture of materials that is capable of reaction within a tube reactor. In some embodiments, the process gas can be a gas mixture for making an alkylene oxide, particularly ethylene oxide. An alkylene oxide-producing process gas can include at least one alkene (preferably ethylene), oxygen, and optionally other gases as may be desirable to provide reaction control, such as alkyl halides, NOx compounds and the like. The process can be operated at superatmospheric pressures (such as 1.01 Bar absolute to 28.5 Bar absolute). In addition, the process temperature within the tube reactor can be controlled at temperatures in a range of 50 to 310° C., although this can vary with the particular process. In the case of ethylene oxide production processes, the reaction tubes contain a suitable oxidation catalyst, for example a silver catalyst, which may be supported and may contain or be used in conjunction with one or more catalyst promoters.

It is to be understood that the above description has been made in an illustrative fashion, and not a restrictive one. Although specific embodiments have been illustrated and described herein, those of ordinary skill in the art will appreciate that other component arrangements can be substituted for the specific embodiments shown. The claims are intended to cover such adaptations or variations of various embodiments of the disclosure, except to the extent limited by the prior art.

In the foregoing Detailed Description, various features are grouped together in exemplary embodiments for the purpose of streamlining the disclosure. This method of disclosure is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the invention.

What is claimed:

1. A tube reactor comprising:
   multiple, substantially parallel reaction tubes arranged within a tube reactor shell, the reaction tubes spaced apart such that a thermal fluid can flow between the reaction tubes and transfer heat between the reaction tubes and the thermal fluid during operation;
   an inlet head positioned adjacent the tube reactor shell defining an inlet head space, where the inlet head space is in fluid communication with an inlet end of the reaction tubes;
   an outlet head positioned adjacent the tube reactor shell including an outlet head shell that defines an outlet head space; and
   at least one insert positioned within the outlet head space, where the insert slopes from an edge region towards an outlet end so that a height of the outlet head space is greater near a center of the outlet than at the edge region and the insert reduces an outlet head volume for reaction product gases by at least twenty-five percent, the outlet head volume being in fluid communication with an outlet end of the reaction tubes and in fluid communication with a reactor outlet.

2. The tube reactor of claim 1, where the outlet head volume is at least approximately 40 percent reduced in volume compared to that defined by the outlet head.

3. The tube reactor of claim 1, where the outlet head shell is at least partially thermally isolated from reaction product gases entering the outlet head space from an exit end of the reaction tubes.

4. The tube reactor of claim 1, where the outlet head is removably attached to the tube reactor shell.

5. The tube reactor of claim 1, where the tube reactor further includes a thermal fluid inlet for introducing a thermal fluid into the tube reactor shell and into contact with the reaction tubes and a thermal fluid outlet for withdrawing the thermal fluid from the tube reactor.

6. The tube reactor of claim 5, where the thermal fluid withdrawn from the tube reactor is contacted with the outlet head shell to maintain the outlet head shell at a temperature approximately equal to a temperature of the tube reactor shell.

7. The tube reactor of claim 1, where the outlet head includes a heat exchanger disposed at least partially within the outlet head to cool reaction product gases exiting the reaction tubes.

8. The tube reactor of claim 7, where the tube reactor includes a second heat exchanger located outside the outlet head, where the second heat exchanger is close-coupled to the heat exchanger disposed at least partially within the outlet head.

9. The tube reactor of claim 1, where the insert occupies a central portion of the space defined by the outlet head and rapidly mixes a reaction product gas exiting the reaction tubes in the outlet head space.

10. The tube reactor of claim 1, where the insert is a diverter plate.

11. The tube reactor of claim 10, were the diverter plate is formed of a number of diverter plate sections assembled into a perforated construction inside the outlet head space.

12. A method of operating a tube reactor, comprising:
    flowing process gases through multiple, substantially parallel reaction tubes arranged within a tube reactor shell, where the process gases react to form reaction product gases in the tubes;
    flowing a thermal fluid into the tube reactor shell, where the thermal fluid can flow between the reaction tubes and transfer heat between the reaction tubes and the thermal fluid;
    removably attaching an outlet head to the tube reactor shell, where the outlet head defines an outlet head space that is in fluid communication with an outlet end of the reaction tubes and includes an outlet head shell;
    exiting the reaction product gases from the tubes into the outlet head, where the outlet head shell is at least partially thermally isolated from the reaction product gases; and
    circulating the thermal fluid from the tube reactor shell through the outlet head shell to maintain the outlet head shell at a temperature approximately equal to a temperature of the tube reactor shell.

13. The method of claim 12, where the outlet head and tube reactor shell include mating flanges and removably attaching the outlet head to the tube reactor shell includes mating the flanges of the outlet head and the tube reactor shell.

14. The method of claim 12, where the method includes maintaining the mating flanges of the outlet had and the tube reactor shell at approximately the temperature of the tube reactor shell.

15. A process, comprising:
    flowing process gases through a tube reactor under conditions such that a chemical reaction occurs within reaction tubes in the tube reactor to form a desired reaction product gas, wherein said tube reactor includes:
        multiple, substantially parallel reaction tubes arranged within a tube reactor shell, where the reaction tubes are spaced apart such that a thermal fluid can flow between the reaction tubes and transfer heat between the reaction tubes and the thermal fluid during operation, and
        an outlet head removably attached to the tube reactor shell and which defines an outlet head space in fluid communication with an outlet end of the reaction tubes and a reactor outlet, the outlet head including an outlet head shell at least partially thermally isolated from process gases contained in the outlet head space;
where the temperature of the outlet head shell is maintained approximately equal to that of the tube reactor shell.

16. The process of claim 15, where the tube reactor includes at least one insert positioned within the outlet head space, where the insert slopes from an edge region towards an outlet end so that a height of the outlet head space is greater near a center of the outlet than at the edge region and the insert reduces an outlet head volume for reaction product gases by at least twenty-five percent, the outlet head volume being in fluid communication with an outlet end of the reaction tubes and in fluid communication with a reactor outlet.

17. The process of claim 15, where the outlet head volume is at least approximately 40 percent reduced in volume compared to that defined by the outlet head.

18. The tube reactor of claim 6, where the outlet head shell includes a jacket and/or a conduit through which the thermal fluid from the tube reactor shell can flow to maintain the temperature of the outlet head shell approximately equal to a temperature of the tube reactor shell.

* * * * *